United States Patent
Yamamoto et al.

(10) Patent No.: US 11,865,624 B2
(45) Date of Patent: Jan. 9, 2024

(54) INSERT AND CUTTING TOOL

(71) Applicant: KYOCERA CORPORATION, Kyoto (JP)

(72) Inventors: Shinsuke Yamamoto, Kirishima (JP); Naohisa Matsuda, Satsumasendai (JP)

(73) Assignee: KYOCERA Corporation, Kyoto (JP)

( * ) Notice: Subject to any disclaimer, the term of this patent is extended or adjusted under 35 U.S.C. 154(b) by 541 days.

(21) Appl. No.: 17/271,613

(22) PCT Filed: Aug. 27, 2019

(86) PCT No.: PCT/JP2019/033521
§ 371 (c)(1),
(2) Date: Feb. 26, 2021

(87) PCT Pub. No.: WO2020/045431
PCT Pub. Date: Mar. 5, 2020

(65) Prior Publication Data
US 2021/0323073 A1    Oct. 21, 2021

(30) Foreign Application Priority Data
Aug. 28, 2018    (JP) .................................. 2018-159437

(51) Int. Cl.
*B23B 27/14*    (2006.01)
*C04B 35/593*    (2006.01)

(52) U.S. Cl.
CPC ........ *B23B 27/148* (2013.01); *C04B 35/5935* (2013.01); *B23B 2226/18* (2013.01)

(58) Field of Classification Search
CPC .............. B23B 27/148; B23B 2226/18; C04B 35/5935; C04B 2235/3206; C04B 2235/3224; C04B 2235/3225; C04B 2235/762
See application file for complete search history.

(56) References Cited

U.S. PATENT DOCUMENTS

2010/0040424 A1*  2/2010  Toyoda ............... C04B 35/5935
                                                              501/97.3

FOREIGN PATENT DOCUMENTS

| | | |
|---|---|---|
| JP | H09301773 A | 11/1997 |
| JP | 2003313079 A | 11/2003 |
| JP | 3550420 B2 | 8/2004 |
| JP | 4478198 B2 | 6/2010 |
| WO | 2008114752 A1 | 9/2008 |
| WO | 2013171324 A1 | 11/2013 |

* cited by examiner

*Primary Examiner* — Karl E Group
*Assistant Examiner* — Cameron K Miller
(74) *Attorney, Agent, or Firm* — VIERING, JENTSCHURA & PARTNER mbB

(57) ABSTRACT

An insert may include a sintered silicon nitride including $\beta$-$Si_3N_4$ as a main component. The area up to 0.5 mm deep from a surface of the sintered silicon nitride is a first region. The first region may include an oxygen content of less than 0.8% by mass. The first region may include $ReMgSi_2O_5N$ (Re is at least one of Yb and Y). A cutting tool may include a holder that extends from a first end toward a second end and includes a pocket on a side of the first end, and the insert located at the pocket.

8 Claims, 3 Drawing Sheets

INSERT AND CUTTING TOOL

CROSS-REFERENCE TO RELATED APPLICATIONS

This application is a national stage entry according to 35 U.S.C. § 371 of PCT Application No. PCT/JP2019/033521 filed on Aug. 27, 2019, which claims priority to Japanese Application No. 2018-159437 filed on Aug. 28, 2018, which are entirely incorporated herein by reference.

TECHNICAL FIELD

The present disclosure relates to an insert and a cutting tool.

BACKGROUND

Since sintered silicon nitride is a material superior in heat resistance and wear resistance, it is used as an insert for cutting tools. Since inserts come into contact with workpieces at high speed during use, they are exposed to high temperatures. For this reason, sintered silicon nitride having a high thermal conductivity is used for inserts that are required to have heat resistance and wear resistance. Sintered silicon nitride, which is a difficult-to-sinter material, requires use of a sintering aid in order to improve its denseness. If the amount of the sintering aid is large, densification can be achieved, but the thermal conductivity is lowered as compared to pure silicon nitride crystals. Patent Document 1 (Japanese Patent No. 3550420) discusses that the amount of the sintering aid is reduced by devising the composition of the sintering aid.

Further, Patent Document 2 (Japanese Patent No. 4478198) discusses that the wear resistance, especially the abrasive wear resistance in high-speed machining, of sintered silicon nitride is improved by adjusting the oxygen content of the sintered silicon nitride in a region up to 0.5 mm deep from the surface to 0.8 to 1.5% by mass in addition to reducing the amount of the sintering aid. It is also discussed that there is a problem that a so-called white portion that is not densified remains on the surface of the sintered silicon nitride if the amount of oxygen on the surface of the sintered silicon nitride is less than 0.8% by mass.

SUMMARY

An insert according to the present disclosure may include a sintered silicon nitride including $\beta$-$Si_3N_4$ as a main component. An area up to 0.5 mm deep from a surface of the sintered silicon nitride is a first region. The first region may include an oxygen content of less than 0.8% by mass. The first region may include $ReMgSi_2O_5N$ (Re is at least one of Yb and Y).

A cutting tool according to the present disclosure may include a holder that extends from a first end toward a second end and includes a pocket on a side of the first end, and the aforementioned insert located at the pocket.

DETAILED DESCRIPTION

<Insert>

Figure 1:
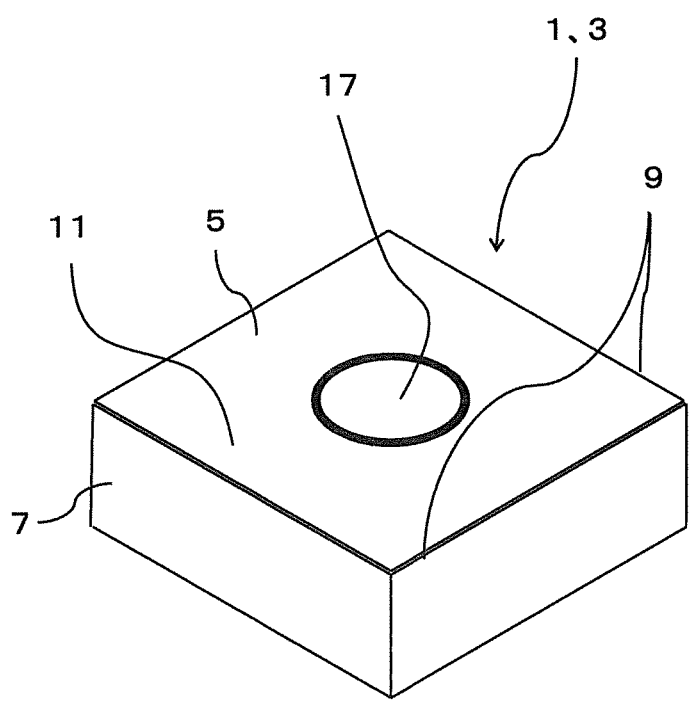
FIG. 1 is a perspective view that illustrates one non-limiting example of the insert according to the present disclosure.

The following describes the insert in the present disclosure in detail with reference to the drawings. However, for ease of explanation, each of the drawings referenced below is simplified and illustrates only the main constituent members needed to describe each non-limiting embodiment. Therefore, the insert may be provided with any constituent member which is not depicted in the referenced drawings. Further, the dimensions of the members in the drawings do not faithfully represent the actual dimensions of the constituent members, the dimensional ratios of the members, or the like.

In this non-limiting embodiment, a substrate 3 to be used as an insert is shown. The insert 1 shown in FIG. 1 is one example of an edge-replaceable cutting insert, which is used by being attached to a predetermined position of the tip of a holder (not shown).

The insert 1 has, for example, a polygonal plate shape and includes a first surface 5 and a second surface 7 adjacent to the first surface 5. Further, it includes a cutting edge 9 located at least a part of the portion where the first surface 5 and the second surface 7 intersect. In FIG. 1, the upper surface corresponds to the first surface 5, and the side surface corresponds to the second surface 7. If the first surface 5 is a so-called rake surface, the second surface 7 is a so-called flank surface. If the first surface 5 is a so-called flank surface, the second surface is a so-called rake surface. The cutting edge 9 of the insert 1 is merely required to be located at least partially. The cutting edge 9 may be located at a portion corresponding to two sides as shown in FIG. 1, or may be located in an annular shape over the entire outer peripheral portion of the first surface 5.

The insert 1 may further include a coating layer 11 located on a surface of the substrate 3. The size of the insert 1 is not particularly limited, and for example, the length of each side of the first surface 5 may be set to approximately 5 to 20 mm. The height from the first surface 5 to the surface (lower surface) located on the opposite side of the first surface 5 may be set to about 3 to 20 mm. The thickness of the coating layer 11 is not particularly limited, and may be set to, for example, 3 to 25 μm. Since the thickness of the coating layer 11 is very small as compared to the size of the insert 1, the size of the insert including the coating layer 11 is substantially the same as the size of the substrate 3.

Figure 2:
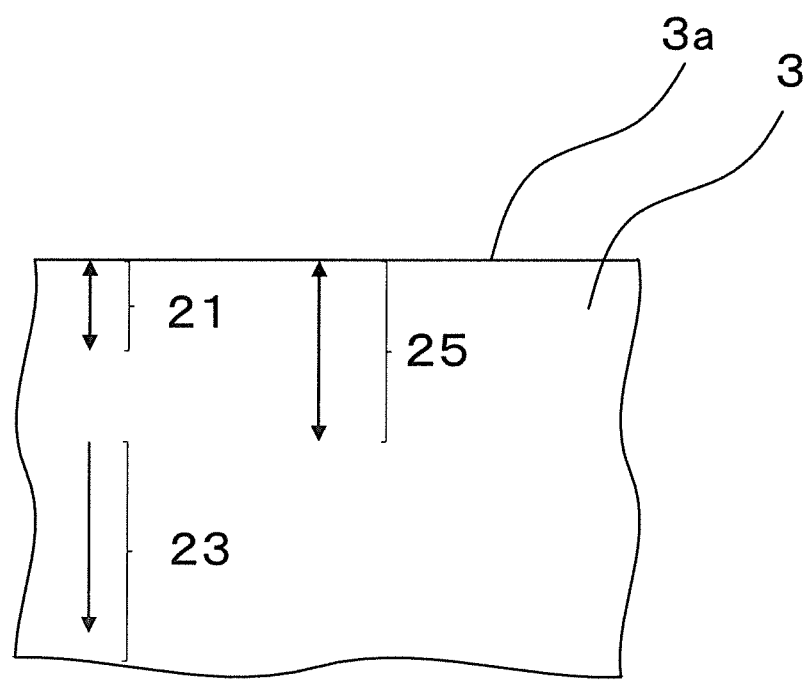
FIG. 2 is an illustration of the first region, the second region, and the third region.

The substrate 3 in the insert 1 in the present disclosure is a sintered silicon nitride including $\beta$-$Si_3N_4$ as a main component. Then, in the sintered silicon nitride of the insert 1 in the present disclosure, an area up to 0.5 mm deep from the surface 3a of the substrate 3 is a first region 21 as shown in FIG. 2. The oxygen content of the first region 21 of the insert 1 in the present disclosure is less than 0.8% by mass. Further, the insert 1 in the present disclosure includes $ReMgSi_2O_5N$ in the first region 21. Here, Re is at least one of Yb and Y. It is noted that FIG. 2 is an illustration of the respective regions (the first through third regions) using a cross-sectional view of the substrate 3. In FIG. 2, hatching is omitted in order to clarify the positional relationship of the plurality of regions.

In the sintered silicon nitride having such a configuration, since the oxygen content of the first region 21 is less than 0.8% by mass, the thermal conductivity of the first region 21 is high. In addition, the problem that a so-called white portion, which is not densified, remains is also suppressed.

For that reason, even if the insert 1 comes into contact with a workpiece (not shown) at high speed, the generated heat quickly moves along the surface of the insert 1, so that the contact portion of the insert 1 with the workpiece is suppressed from being excessively heated. Further, the insert 1 in the present disclosure has a long life because the sintered silicon nitride is high in heat resistance and wear resistance.

Further, the insert 1 in the present disclosure may be characterized in that the ratio (Ia/Ib) is 0.10 or more where Ia is an X-ray intensity at a crystal plane (11-1) of ReMgSi$_2$O$_5$N in the first region 21, and Ib is an X-ray intensity at a crystal plane (101) of the β-Si$_3$N$_4$ in the first region 21. In particular, the ratio (Ia/Ib) may be 0.15 or more. The sintered silicon nitride having such a configuration has a high thermal conductivity.

For the X-ray intensity Ia, the peak of the crystal plane (11-1) of ReMgSi$_2$O$_5$N is used. For the X-ray intensity Ib, the peak of the crystal plane (101) of β-Si$_3$N$_4$ is used.

The X-ray intensity Ia increases as the position gets closer to the surface 3a of the sintered silicon nitride, and Ia decreases as the position gets farther from the surface 3a. If the X-ray intensity Ia and the X-ray intensity Ib are measured at a position 0.5 mm away from the surface 3a, the ratio (Ia/Ib) of the first region 21 is 0.10 or more if the ratio (Ia/Ib) is 0.10 or more.

As the X-ray data of ReMgSi$_2$O$_5$N, it is advisable to use International Center for Diffraction Data 00-048-1634 if Re is Yb. If Re is Y, it is advisable to use International Center for Diffraction Data 00-048-1632. If Re includes Y and Yb, it is advisable to use X-ray data close to the actually measured X-ray peak. As the X-ray data of β-Si$_3$N$_4$, it is advisable to use the International Center for Diffraction Data 01-071-0623.

In the insert 1 in the present disclosure, an area 1.0 mm or more deep from the surface 3a of the sintered silicon nitride is a second region 23, the second region 23 may include an oxygen content of less than 1.20% by mass. In particular, the oxygen content of the second region 23 may be less than 1.10% by mass. With such a configuration, a relatively high thermal conductivity is achieved not only at the surface 3a of the sintered silicon nitride but also at the position of the second region 23, so that the entire insert 1 is high in thermal conductivity.

Further, the sintered silicon nitride in the insert 1 in the present disclosure may include Mg in an amount of 0.05% by mass or more and 0.40% by mass or less, and Re in an amount of 1.4% by mass or more and 2.0% by mass or less. The content of Re may be 1.5% by mass or more and 1.7% by mass or less. With such a configuration, it is easy to include ReMgSi$_2$O$_5$N, and the insert 1 includes a dense sintered silicon nitride superior in thermal conductivity.

Further, the sintered silicon nitride in the insert 1 in the present disclosure may include Zr in an amount of 0.05% by mass or more and 0.15% by mass or less. With such a configuration, color unevenness of the surface 3a of the sintered silicon nitride is likely to be suppressed. Further, the sintered silicon nitride in the insert 1 in the present disclosure may include Al in an amount of 0.05% by mass or more and 0.25% by mass or less. Moreover, it may include other elements.

In the insert 1 in the present disclosure, an area up to 1 mm deep from the surface 3a of the sintered silicon nitride is a third region 25. The thermal conductivity of the third region 25 may exceed 61 W/m·K. As shown in FIG. 2, the third region 25 includes the first region 21. Further, in the insert 1 in the present disclosure, the thermal conductivity of the third region 25 may be 70 W/m·K or more. The insert 1 having such characteristics has a long life because the generated heat is easily dissipated.

In the insert 1 in the present disclosure, the sintered silicon nitride may include β-Si$_3$N$_4$ in an area ratio of 90% or more, particularly 95% or more, and more particularly 98% or more. With such a configuration, the thermal conductivity of the entire insert 1 is high.

The coating layer 11 to be used for the insert 1 in the present disclosure may be a hard film formed by CVD. The coating layer 11 to be used for the insert 1 in the present disclosure may be a hard film formed by PVD. Having the coating layer 11 in this manner results in high wear resistance.

<Cutting Tool>

Next, a cutting tool in the present disclosure is described with reference to a drawing.

Figure 3:
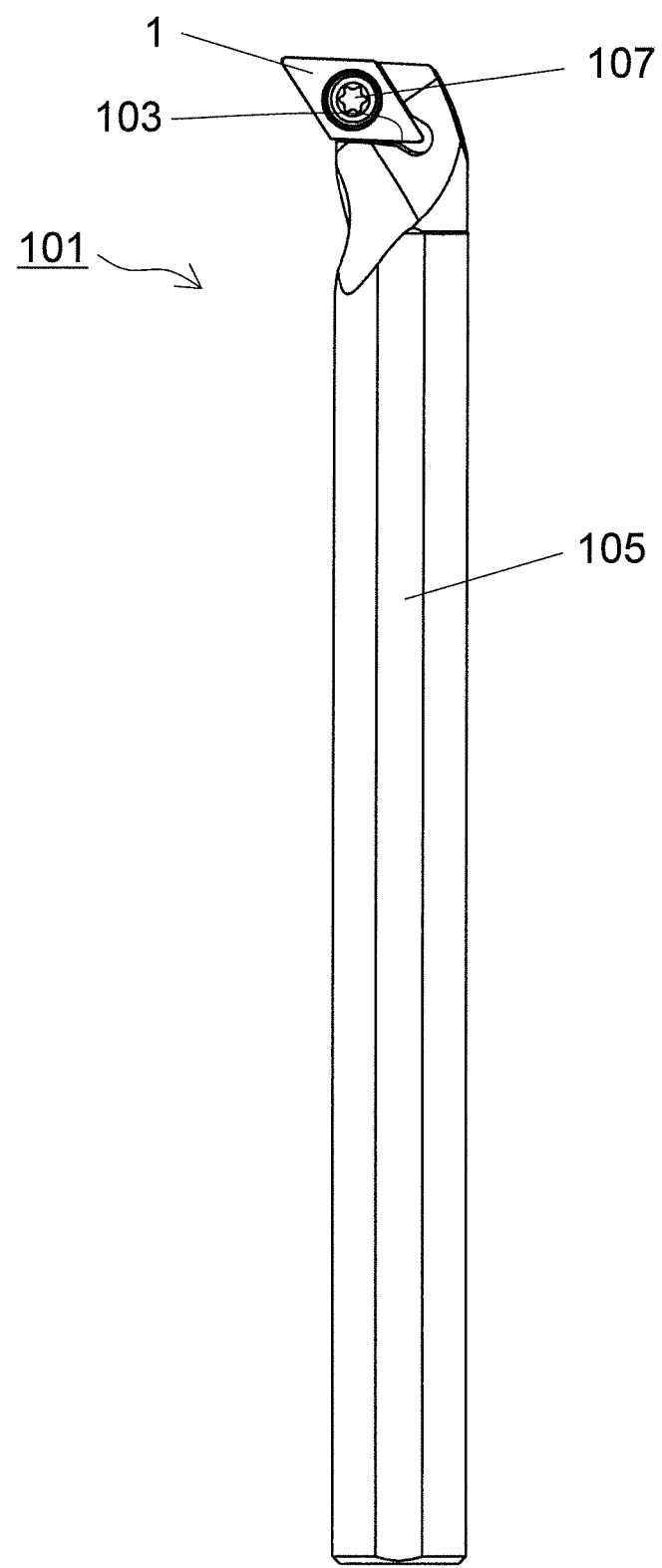
FIG. 3 is a plan view of a cutting tool according to the present disclosure.

The cutting tool 101 in the present disclosure includes, for example, a bar-shaped body extending from a first end (an upper end in FIG. 3) toward a second end (a lower end in FIG. 3) as illustrated in FIG. 3. The cutting tool 101 includes a holder 105 including a pocket 103 on a side of the first end (a front end side), and the insert 1 located at the pocket 103 as illustrated in FIG. 3. The cutting tool 101 includes the insert 1 and is therefore capable of carrying out a stable cutting process over a long term.

The pocket 103 is a part that permits attachment of the insert 1. The pocket 103 includes a seating surface parallel to a lower surface of the holder 105, and a constraining side surface inclined relative to the seating surface. The pocket 103 opens into a side of the first end of the holder 105.

The insert 1 is located in the pocket 103. A lower surface of the insert 1 may be in a direct contact with the pocket 103. Alternatively, a sheet (not illustrated) may be held between the insert 1 and the pocket 103.

The insert 1 is attached to the holder 105 such that at least a part of a region used as a cutting edge 7 in a ridgeline where the first surface 3 intersects with the second surface 5 is protruded outward from the holder 105. In the present non-limiting embodiment, the insert 1 is attached to the holder 105 by a screw 107. Specifically, the insert 1 is attached to the holder 105 in such a manner that screw parts are engaged with each other by inserting the screw 107 into a through hole 17 of the insert 1, and by inserting a front end of the screw 107 into a screw hole (not illustrated) formed in the pocket 103.

For example, steel and cast iron are usable as a material of the holder 105. Of these materials, high toughness steel may be used.

The present non-limiting embodiment has illustrated and described a cutting tool for use in a so-called turning process. Examples of the turning process include inner diameter processing, outer diameter processing and grooving process. The cutting tool is not limited to ones which are used for the turning process. For example, the insert 1 of the above non-limiting embodiment may be used for a cutting tool for use in a milling process.

EXAMPLES

Examples of the insert in the present disclosure are shown below. The insert in the present disclosure includes a sintered silicon nitride. The sintered silicon nitride is obtained, for example, by adding a binder to a compounded powder prepared by mixing α-Si$_3$N$_4$ powder, Yb$_2$O$_3$ powder or $Y_2O_3$ powder, $Mg(OH)_2$ powder, and, if necessary, $ZrO_2$ powder and $Al_2O_3$ powder, which are raw material powders, press-molding the resultant mixture into the shape of an insert, and then performing the first sintering process and the second sintering process described below.

The particle size of the raw material powders may be 2.0 µm or less. If the particle size is adjusted to 1.0 µm or less, the sintering time can be shortened.

In this example, α-$Si_3N_4$ powder with a mean particle size of 0.7 µm, $Yb_2O_3$ powder or $Y_2O_3$ powder with a mean particle size of 1.0 µm, $Mg(OH)_2$ powder with a mean particle size of 0.4 µm, $ZrO_2$ powder with a mean particle size of 0.1 µm, and $Al_2O_3$ powder with a mean particle size of 0.3 µm were used.

The first sintering process is a process involving heating at a first sintering temperature of 1740 to 1840° C. for 1 to 3 hours, then heating at a second sintering temperature of 1900 to 1990° C. for 2 to 6 hours, and then cooling once. The atmosphere of the first sintering process is a nitrogen atmosphere of 0.5 to 2 MPa.

The second sintering process is a process of further heating the sintered material obtained by the first sintering process at a third sintering temperature of 1840 to 1900° C. for 2 to 6 hours. The atmosphere of the second sintering process is a nitrogen atmosphere of 0.01 MPa to 0.4 MPa.

By making the pressure of the atmosphere of the second sintering process lower than the pressure of the atmosphere of the first sintering process in the course of performing the two-step sintering process in this way, the amount of oxygen can be reduced on the surface of the sintered material. In addition, a white portion does not occur due to so-called insufficient densification.

In this example, sintering was performed under the sintering conditions shown in Table 1. The compositions (Re, Mg, Zr) of the central portion of the resulting sintered silicon nitride are almost the same if molded articles having the same compounded composition are used, and are therefore collected in Table 2. The sintered silicon nitride also included Si and N forming silicon nitride, but their description is omitted.

The oxygen content and the crystal phase of the area up to 0.5 mm deep from the surface of the resulting sintered silicon nitride, that is, the first region, were measured. To measure the oxygen content, the sintered silicon nitride was processed such that the first region remained, the remaining sintered silicon nitride was crushed into powder, and the measurement was performed by oxygen/nitrogen analysis using a model TCH-600 manufactured by LECO Corporation. The crystal phase was measured using a model MiniFlex 600 manufactured by Rigaku Corporation for a portion 0.5 mm deep from the surface of the sintered silicon nitride exposed before the measurement of the oxygen content. The X-ray tube of MiniFlex 600 is Cu(Kα). The tube voltage is 40 kV. The tube current is 15 mA. The measurement range is 10° to 80°. The measurement step is 0.02 deg. The speed is 20 deg/min.

It also may be measured using the model MiniFlex 600 manufactured by Rigaku Corporation after removing the portion 0.5 mm deep from the surface of the sintered silicon nitride.

As to the thermal conductivity of the area up to 1 mm deep from the surface of the sintered material, that is, the third region, the sintered material was processed such that the area 1 mm or more deep from the surface of the sintered material, namely, the second region, was removed to make a 1 mm thick plate composed of the third region, and then the thermal conductivity of the third region was measured by a laser flash method using a model LFA-502 manufactured by Kyoto Electronics Manufacturing Co., Ltd. The measurement conditions are in conformity with JIS R 1611 2010. These measurements are shown in Table 3. In Table 3, β-$Si_3N_4$ crystals were detected in all samples, so their description is omitted.

TABLE 1

| Sample No. | Composition | First sintering temperature (° C.) | First sintering time (hours) | First pressure (MPa) | Second sintering temperature (° C.) | Second sintering time (hours) | Second pressure (MPa) | Third sintering temperature (° C.) | Third sintering time (hours) | Third pressure (MPa) |
|---|---|---|---|---|---|---|---|---|---|---|
| 1 | 1 | 1800 | 2 | 1 | 1950 | 4 | 1 | — | — | — |
| 2 | 3 | 1800 | 2 | 1 | 1950 | 4 | 1 | — | — | — |
| 3 | 1 | 1800 | 2 | 1 | 1950 | 4 | 1 | 1850 | 4 | 0.4 |
| 4 | 1 | 1800 | 2 | 1 | 1950 | 4 | 1 | 1850 | 4 | 0.2 |
| 5 | 1 | 1800 | 2 | 1 | 1950 | 4 | 1 | 1850 | 4 | 0.1 |
| 6 | 2 | 1800 | 2 | 1 | 1950 | 4 | 1 | 1850 | 4 | 0.1 |
| 7 | 2 | 1800 | 2 | 1 | 1950 | 4 | 1 | 1800 | 4 | 0.1 |

TABLE 2

| Composition | Mg (% by mass) | Yb (% by mass) | Zr (% by mass) | Al (% by mass) |
|---|---|---|---|---|
| 1 | 0.3 | 1.7 | 0 | 0.1 |
| 2 | 0.3 | 1.7 | 0.1 | 0.1 |
| 3 | 1.0 | 1.9 | 0.3 | 0.1 |

TABLE 3

| Sample No. | Oxygen content in first region (% by mass) | Oxygen content in second region (% by mass) | Crystal phase in first region | Thermal conductivity in third region (W/m · K) | Ia/Ib |
|---|---|---|---|---|---|
| 1 | 0.92 | 1.52 | — | — | — |
| 2 | 1.15 | 2.07 | $ReMgSi_2O_5N$ | 45 | 0.03 |
| 3 | 0.78 | 1.45 | $ReMgSi_2O_5N$ | 62 | 0.08 |
| 4 | 0.63 | 1.20 | $ReMgSi_2O_5N$ | 65 | 0.11 |
| 5 | 0.5 | 1.06 | $ReMgSi_2O_5N$ | 70 | 0.15 |
| 6 | 0.50 | 1.06 | $ReMgSi_2O_5N$ | 70 | 0.15 |
| 7 | 0.60 | 1.12 | $ReMgSi_2O_5N$ | 65 | 0.11 |

As shown in Tables 1 to 3, the thermal conductivity was relatively low in Samples Nos. 1 and 2 in which the oxygen content in the first region exceeded 0.8% by mass. The thermal conductivity was low also in Sample No. 2 in which ReMgSi$_2$O$_5$N was present in the first region. On the other hand, in Samples Nos. 3 to 7 in which ReMgSi$_2$O$_5$N was present in the first region and the oxygen content in the first region was 0.8% by mass or less, a high thermal conductivity of 61 W/m·K or more was obtained. In addition, there were no white portions with so-called insufficient densification on the surface of the sintered silicon nitrides of Samples Nos. 3 to 7. The same result was obtained even if Y was used as Re.

The insert in the present disclosure and a cutting tool using the same are not limited to the above-described embodiments, and various modifications and changes may be made without departing from the gist of the present disclosure.

DESCRIPTION OF THE REFERENCE NUMERALS

1: Insert
3: Substrate
5: First surface
7: Second surface
9: Cutting edge
11: Coating film
17: Through hole
21: First region
23: Second region
25: Third region

The invention claimed is:

1. An insert, comprising:
a sintered silicon nitride comprising β-Si$_3$N$_4$ as a main component,
wherein
an area up to 0.5 mm deep from a surface of the sintered silicon nitride is a first region, and
the first region comprises an oxygen content of less than 0.8% by mass and comprises ReMgSi$_2$O$_5$N with Re comprising Yb, and Y, or combinations thereof.

2. The insert according to claim 1, wherein
a ratio (Ia/Ib) is 0.10 or more where Ia is an X-ray intensity at a crystal plane (11-1) of ReMgSi$_2$O$_5$N in the first region, and Ib is an X-ray intensity at a crystal plane (101) of the β-Si$_3$N$_4$ in the first region.

3. The insert according to claim 1, wherein
an area 1.0 mm or more deep from the surface of the sintered silicon nitride is a second region, and the second region comprises an oxygen content of less than 1.10% by mass.

4. The insert according to claim 1, wherein
the sintered silicon nitride comprises Mg in an amount of 0.05% by mass or more and 0.40% by mass or less, and Re in an amount of 1.50% by mass or more and 1.70% by mass or less.

5. The insert according to claim 1 to wherein
the sintered silicon nitride comprises Zr in an amount of 0.05% by mass or more and 0.15% by mass or less.

6. The insert according to claim 1, wherein
an area up to 1 mm deep from the surface of the sintered silicon nitride is a third region, and the third region comprises a thermal conductivity exceeding 61 W/m·K.

7. The insert according to claim 1, wherein
an area up to 1 mm deep from the surface of the sintered silicon nitride is a third region, and the third region comprises a thermal conductivity of 70 W/m·K or more.

8. A cutting tool, comprising:
a holder that extends from a first end toward a second end and comprises a pocket on a side of the first end; and
the insert according to claim 1 that is located at the pocket.

* * * * *